United States Patent
Estkowski

(10) Patent No.: US 9,310,809 B2
(45) Date of Patent: Apr. 12, 2016

(54) SYSTEMS AND METHODS FOR COLLABORATIVELY CONTROLLING AT LEAST ONE AIRCRAFT

(71) Applicant: The Boeing Company, Chicago, IL (US)

(72) Inventor: Regina I. Estkowski, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 13/692,633

(22) Filed: Dec. 3, 2012

(65) Prior Publication Data

US 2014/0156109 A1 Jun. 5, 2014

(51) Int. Cl.
*G05D 1/10* (2006.01)
*G08G 5/00* (2006.01)

(52) U.S. Cl.
CPC .............. *G05D 1/101* (2013.01); *G08G 5/0034* (2013.01)

(58) Field of Classification Search
CPC .............................. G05D 1/101; G08G 5/0034
USPC ............................................................ 701/2
See application file for complete search history.

(56) References Cited

U.S. PATENT DOCUMENTS

| 7,212,917 | B2 | 5/2007 | Wilson |
| 7,457,690 | B2 | 11/2008 | Wilson et al. |
| 8,060,295 | B2 | 11/2011 | Estkowski et al. |
| 2006/0106506 | A1* | 5/2006 | Nichols et al. ................ 701/3 |
| 2007/0233338 | A1* | 10/2007 | Ariyur et al. ................ 701/23 |
| 2009/0125221 | A1* | 5/2009 | Estkowski et al. ........... 701/120 |
| 2010/0174475 | A1 | 7/2010 | Estkowski et al. |
| 2012/0123628 | A1* | 5/2012 | Duggan et al. ................ 701/24 |
| 2012/0143482 | A1 | 6/2012 | Goossen |
| 2012/0158280 | A1* | 6/2012 | Ravenscroft ................. 701/400 |
| 2012/0280087 | A1* | 11/2012 | Coffman et al. ............. 244/175 |
| 2013/0270394 | A1* | 10/2013 | Downs ....................... 244/76 R |

FOREIGN PATENT DOCUMENTS

| EP | 1657611 | 5/2006 |
| WO | WO 2009091431 | 7/2009 |

OTHER PUBLICATIONS

U.S. Appl. No. 13/246,070, filed Sep. 27, 2011, Estkowski, et al.
U.S. Appl. No. 13/303,285, filed Nov. 30, 2011, Estkowski, et al.
European Search Report for counterpart EP 13195522.1-1802, dated May 26, 2015.

* cited by examiner

*Primary Examiner* — Fadey Jabr
*Assistant Examiner* — Yazan A Soofi
(74) *Attorney, Agent, or Firm* — Joseph M. Butscher; The Small Patent Law Group, LLC

(57) ABSTRACT

An unmanned vehicle management system includes an unmanned aircraft system (UAS) control station controlling one or more unmanned vehicles (UV), a collaborative routing system, and a communication network connecting the UAS and the collaborative routing system. The collaborative routing system being configured to receive flight parameters from an operator of the UAS control station and, based on the received flight parameters, automatically present the UAS control station with flight plan options to enable the operator to operate the UV in a defined airspace.

20 Claims, 8 Drawing Sheets

SYSTEMS AND METHODS FOR COLLABORATIVELY CONTROLLING AT LEAST ONE AIRCRAFT

STATEMENT REGARDING FEDERALLY SPONSORED RESEARCH AND DEVELOPMENT

This invention was made with government support under U.S. Government Contract Number NND11AQ73C awarded by the National Aeronautics and Space Administration (NASA). The government has certain rights in the invention.

BACKGROUND

The present disclosure relates generally to systems and methods for collaboratively controlling at least one mobile platform.

Controlling mobile platforms, such as aircraft operating in a defined space, is a task that has both civilian and military applications. In a common aircraft situation, air traffic management may involve moving commercial airplanes and/or unmanned aerial vehicles (UAV) through airspace. Civilian air traffic control and military aircraft (asset or vehicle) tasking include the coordinated movement of multiple aircraft (assets or vehicles) through a crowded space filled with terrain, weather, and other obstructions.

Conventional methods of controlling assets operating in the defined airspace utilize various asset control systems that may be located, for example, at various different air traffic control centers. Additionally, a significant quantity of personnel, or air traffic managers, are required to operate the various asset control systems and thereby control the movement of the assets through the defined airspace.

However, as the quantity of assets moving through the defined airspace increases, the quantity of assets controlled by a single air traffic manager may also increase. Thus, in some situations, a single air traffic manager may be responsible for controlling the movement of numerous assets in the defined airspace. As a result, it may become more difficult for the air traffic manager to propose a flight plan to be followed by each of the assets. Additionally, it may become increasingly more difficult for the air traffic manager to propose a flight plan that maintains a sufficient or safe air separation between the asset being controlled by the air traffic manager and other assets operating in the defined airspace. Thus, as the quantity of air assets operating in the defined airspace increases, the asset control systems currently utilized may not enable the air traffic managers to effectively manage the assets in the defined airspace and/or to revise a flight plan that maintains a safe air separation between each of the assets traveling through the defined airspace.

SUMMARY

In accordance with one embodiment, an unmanned vehicle management system is provided. The unmanned vehicle management system includes an unmanned aircraft system (UAS) control station controlling one or more unmanned vehicles (UV), a collaborative routing system, and a communication network connecting the UAS and the collaborative routing system. The collaborative routing system being configured to receive flight parameters from an operator of the UAS control station and, based on the received flight parameters, automatically present the UAS control station with flight plan options to enable the operator to operate the UV in a defined airspace.

In accordance with another embodiment, a method for generating a flight plan for one or more aircraft is provided. The method includes receiving, from an operator of an aircraft control station, a plurality of flight parameters, automatically generating a plurality of flight plan options using a collaborative routing system, and automatically presenting the operator of the aircraft control station with the plurality of flight plan options to enable the operator to operate the aircraft in a defined airspace.

In accordance with a further embodiment, a method for generating a plurality of mutually feasible flight plans for a plurality of aircraft is provided. The method includes receiving a first set of flight parameters for controlling an operation of a first aircraft from the operator, receiving a second set of flight parameters for controlling an operation of a second aircraft from the operator, and generating a mutually feasible set of flight plan options for the first and second aircraft.

The features, functions, and advantages that have been discussed can be achieved independently in various embodiments or may be combined in yet other embodiments, further details of which can be seen with reference to the following description and drawings.

DETAILED DESCRIPTION

Figure 1:
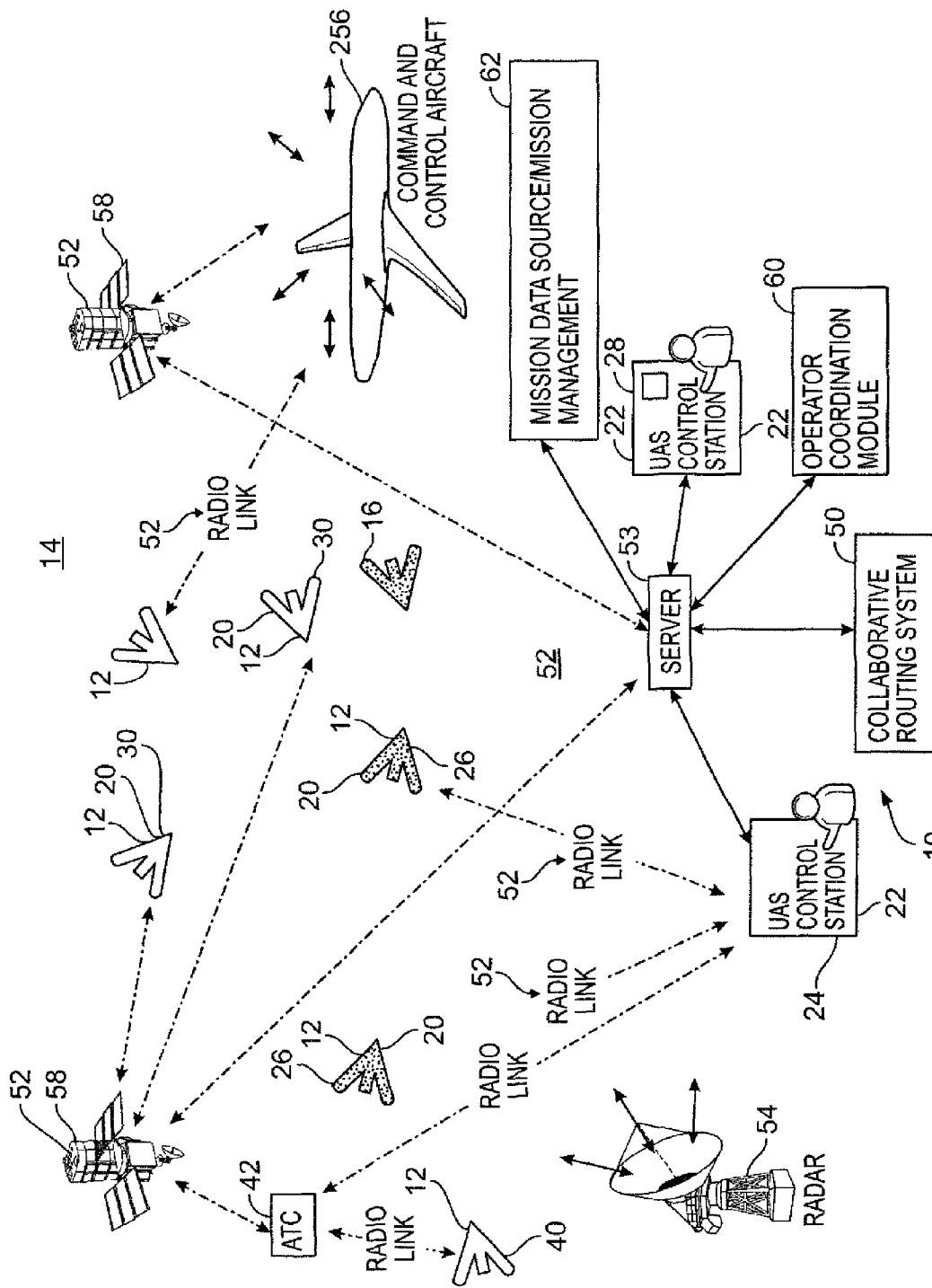
FIG. 1 is a schematic view of a defined airspace for operating aircraft being controlled using a collaborative routing system in accordance with one embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein is a vehicle management system that may be utilized, for example, mobile platforms such as aircrafts, operating in a defined air space. Although, various embodiments are described herein with respect to controlling the operation of an unmanned vehicle (UV), it should be realized that the methods and systems described herein may also be utilized to control an operation of a manned or piloted vehicle, such as for example, a commercial or General Aviation aircraft. In operation, the vehicle management system is configured to provide a platform to enable collaboration between one or more human operators controlling the operation of one or more of the aircraft and the system in controlling the airspace and managing a large number of aircraft.

Accordingly, FIG. 1 is a schematic illustration of a vehicle management system 10 that may be utilized to control the operation of a plurality of aircraft 12 that are operating in a defined airspace 14. The aircraft 12 may include manned aerial vehicles, such as piloted commercial or military aircraft, and/or unmanned vehicles (UV), such as surveillance aircraft, employed in military use, commercial use, or private use, or any combination thereof. In operation, the aircraft 12 each travel along a flight path, or trajectory, that may be based on a flight plan that is generated as described in more detail below.

In various embodiments, some of the aircraft 12 may be embodied as UVs 20 that may be controlled by one or more unmanned aircraft system (UAS) control stations 22 that form part of the vehicle management system 10. For example, a UAS control station 24 may control the operation of one or more UVs 26 and a UAS control station 28 may control the operation one or more UVs 30. In various embodiments, the UAS control station 24 may control the operation of both the UVs 26 and the UVs 30. Additionally, some of the aircraft 12 may be embodied as uncontrolled aircraft 16 or as piloted aircraft 40 that may be controlled, by for example, an air traffic controller (ATC) 42 via voice or data link communications.

The vehicle management system 10 also includes a collaborative routing system 50 that functions interactively with the operators of the aircraft 12. In general, the collaborative routing system 50, in some embodiments, provides a framework for generating flight plans and in-flight re-routes that best meets or optimizes, the operational objectives requested by each individual aircraft 12 while also maintaining a safe separation distance between the various aircraft 12 operating in the defined airspace 14. More specifically, the collaborative routing system 50 is configured to receive a set of flight parameters from an operator of the UAS control station 22 for each individual aircraft 12, and based on the received flight parameters, current and projected airspace conditions, mission or ATC directive, and/or other information available to the collaborative routing system 50, automatically present the UAS control station 22 with a set of flight plan options for each individual aircraft 12. Flight parameters may represent any objective desired to be achieved by the aircraft 12. For example, flight parameters input to the collaborative routing system 50 for an exemplary aircraft 12 may include a departure point, a departure time, an arrival point, an arrival time, an average speed, a maximum altitude, minimal possible fuel use, etc.

Accordingly, the collaborative routing system 50 provides an interactive platform to enable the operator of one or more aircraft 12 to work collaboratively with operators of other aircraft 12 to provide each individual aircraft 12 with a flight plan that meets as many of the requested flight parameters as is feasible. Feasible, as used herein, generally means capable of being accomplished or possible under required constraints, such as safety constraints or required procedure. For example, assume that the operator of the UAS 24 enters four flight parameters for the UV 26 that include a departure point, a starting time, a destination point, and destination and arrival time windows. Moreover, assume that the specified criteria and aircraft characteristics imply a direct great circle route. Suppose the departure and arrival points are such that the route lies within a rural area of low traffic, the weather is clear, and an acceptable route exists in class G airspace. In this case the collaborative routing system 50 may determine the specified criteria set is feasible and provide the user with a route that has the highest probability of meeting time the constraints.

Now suppose that the departure and arrival points are such that the required great circle route takes the aircraft through a storm system that must be avoided and through a Class B airspace terminal area requiring ATC directive. In this case, the collaborative routing system 50 may alert the user that the provided criteria set is infeasible due to a weather system that must be avoided and routing through a terminal area with Class B airspace. The collaborative routing system 50 may then query the user as to if the terminal area should be avoided and as to relative importance of arrival time vs. departure time. If for instance arrival time takes priority, the collaborative routing system 50 may provide the user with various route options having various starting times that satisfy the arrival time, departure and destination point constraints, and user specification on terminal area avoidance. Once a route is agreed upon, the collaborative routing system 50 may store the final criteria set defining the route. Also when in route the collaborative routing system 50 may continue to monitor the aircraft progress and airspace condition. If changes in airspace condition or aircraft progress preclude satisfying the specified timed route the collaborative routing system 50 may alert the operator and provide suggested re-routes. In the case that the aircraft behavior is not conforming to route the collaborative routing system 50 may query the operator for a reason, request updated reroute criteria, or ask if the operator intends to return to plan. The collaborative routing system 50 may then update routing or provide options according to operator response.

In various embodiments, the UAS control stations 20, the aircraft 12, and the collaborative routing system communicate via a communication network 52. The communication network 52 may include a communications server 53 that coordinates communications between various devices that form the communications network 52. The various devices may include ground-based communication devices and software, such as communications servers, routers, cables, and interface software, such as for example, an airspace monitoring and aircraft tracking device 54. Moreover, the communications network 52 may include air based communication devices, such as for example, those on board an airborne command and control aircraft 56, aircraft located radios and modems, and/or one or more communication satellites 58. The communication system 52 may also include satellite transceivers (not shown) to facilitate communications with the satellite 58 to exchange data with the collaborative routing system 50. Other communication configurations may be implemented, such as a radio based communication system using an antenna (not shown), or other communication techniques.

In various embodiments, a centralized operator coordination module 60 may be utilized to coordinate operator inputs from the UAS control stations 22 and air traffic controller 42 directives to the collaborative routing system 50. The centralized operator coordination module 60 may be formed as part of the collaborative routing system 50. Optionally, the centralized operator coordination module 60 may be located separately from the collaborative routing system 50. In operation, the centralized operator coordination module 60 may receive the flight parameters from the aircraft 12 and transmit the flight parameters to the collaborative routing system 50 for subsequent processing. In this embodiment, the centralized operator coordination module 60 may communicate with the aircraft 12 and the collaborative routing system 40 using the communication network 52.

The centralized operator coordination module 60 may compile aircraft data from the aircraft 12, from a mission data source module 62, and/or the UAS control stations 22, etc. Moreover, the centralized operator coordination module 60 may analyze the data, and function interactively with the collaborative routing system 50 to provide the flight plan options as described in more detail below.

In various embodiments, the vehicle management system 10 may be configured as a distributed system where each aircraft 12 may implement the collaborative routing system 50, or a portion thereof, and may compile data, analyze the data, and provide flight plans to various aircraft 12 operating in the defined airspace 14 via the communication network 52. Additionally, the collaboratively routing system 50, or portions thereof, may be implemented in one or more of the UAS control consoles 22.

Figure 2:
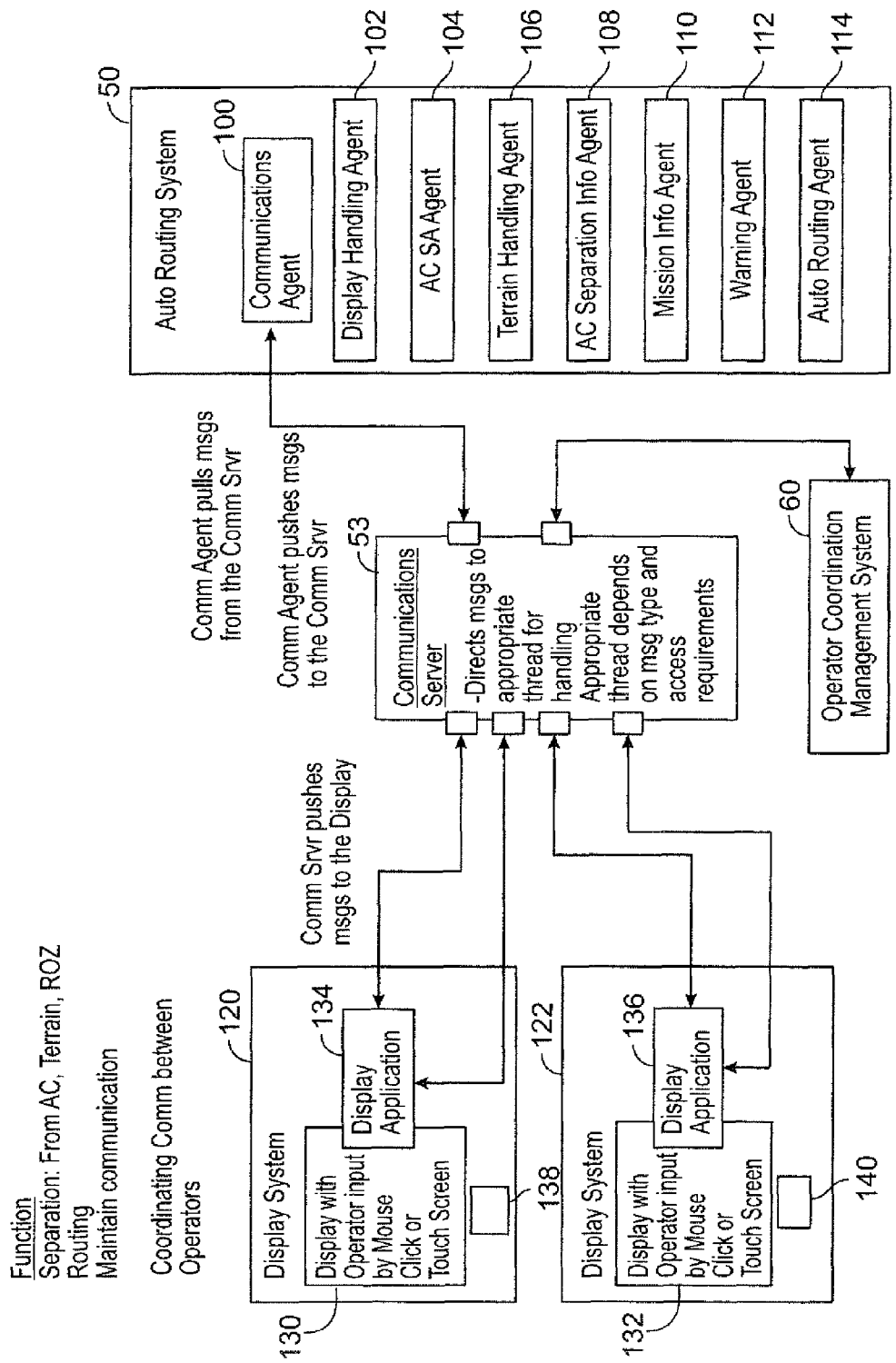
FIG. 2 is a functional block diagram of a portion of the vehicle management system 10 as shown in FIG. 1 in accordance with one embodiment.

FIG. 2 is a functional block diagram of a portion of the vehicle management system 10 shown in FIG. 1. As described above, the vehicle management system 10 includes the collaborative routing system 50 which may include various software agents or subroutines configured to implement various tasks performed by the collaborative routing system 50. Software Agent as used herein generally means a computer program that performs various actions continuously and autonomously. However, the agent may not operate continuously or completely autonomously in some embodiments.

In various embodiments, the collaborative routing system 50 may include a communications agent 100 for maintaining communication between the collaborative routing system 50, the operator coordination module 60, a first display system 120 that may be associated with the UAS 24, and a second display system 122 that may be associated with the UAS 28. The first and second display systems 120 and 122 may include a display 130 and 132, respectively, a display driver 134 and 136, respectively, for driving the displays 130 and 132, and an input device 138 and 140, respectively, for interacting with the system or the displays 130 and 132, respectively. The input devices 130 and 140 may be embodied as a mouse, a keyboard, a touchscreen, etc. It should be realized that the above described agents represent only a portion of the agents utilized by the collaborative routing system 50 are described and illustrated. Thus, the collaborative routing system 50 may include other agents. For example, the communications agent 100 may include various helper agents to carry out tasks such as reformatting or packaging data received from various sources into a form suitable for system use. Moreover, in some embodiments, the collaborative routing system 50 may include multiple communications agents 100 for handling various communication, such as for example, communication with the aircraft 12, communication with the ATC 42, and/or communication with various data source entities. It should be therefore be realized that the various agents described above may each include multiple related or helper agents.

The collaborative routing system 50 may also include a display handling agent 102 for managing information passed between the auto-routing system and the display systems 120 and 122, an aircraft information situation awareness (AC SA) agent 104 which maintains situation awareness of the trajectory or flight path of each aircraft 12 operating in the defined airspace 14. The collaborative routing system 50 may further include a terrain handling agent 106 for acquiring, maintaining, and evaluating information pertaining to various physical obstructions, such as mountains, buildings, etc. within the defined airspace 14, an aircraft separation information agent 108 for maintaining and updating required separation distances and times between aircraft 12 in the defined airspace and between aircraft 12 and obstacles such as terrain, weather, etc. In operation, the separation information agent 108 may obtain required separation information, such as distance and/or time from a database based on current airspace conditions. Optionally, and in some embodiments, the aircraft separation information agent 108 may determining the separation distance and times. The collaborative routing system 50 may also include a mission information agent 110 for receiving flight parameters from each of the aircraft 12 in the defined airspace 14, a warning agent 112 for monitoring a separation distance between the aircraft 12 and initiating a corrective response if two of the aircraft are currently operating at an unsafe separation distance or are projected to be operating at the unsafe separation distance.

The corrective response may include, for example, generating a visual and/or audible indicator on the aircraft 12 and/or the UAS control consoles 22. The corrective response may also include automatically re-routing at least one of the aircraft 12 using an automated routing agent 114.

It should be realized that although FIG. 2 illustrates the collaborative routing system 50 as including the above described agents 100-114, a portion of the agents 100-114 may be located on different devices in the system 10. For example, a portion of the agents 100-114 may be installed on the UAS control stations 22, the command and control aircraft 56 and/or the operator coordination module 60. It should also be realized that different embodiments could contain variations on the depicted agents. For example there may be multiple communications agents to handle multiple types of communications or some agents may have associated helper agents that manage various tasks such as data processing, analysis, etc. required for the primary agent to do its job. Moreover, it should be realized that although various embodiments are described with respect to implementing an agent-based system, the functionality represented by the various agents 100-114 may be implemented as computer subroutines installed on the UAS control stations 22, the command and control aircraft 56 and/or the operator coordination module 60.

The UAS control consoles 22, the collaborative routing system 50, and/or the operator coordination module 60 may be embodied as standalone computers and/or portable computers such as a laptop computer or a hand-held computer. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer".

As described above, the vehicle management system 10 is operable to provide a platform to enable iterative interaction between one or more humans and a system to generate mutually acceptable flight plans. More specifically, the vehicle management system automatically provides the human, e.g. the operator, with a plurality of feasible flight plan options.

The system then enables the human to interactively collaborate with the system to select a single flight plan from the list of flight plan options provided by the system. In various embodiments, the vehicle management system 10 is capable of generating flight plan options for various aircraft operational modes. The operational modes may include, for example a preflight mode, an inflight mode, and a loss of separation mode.

Figure 3:
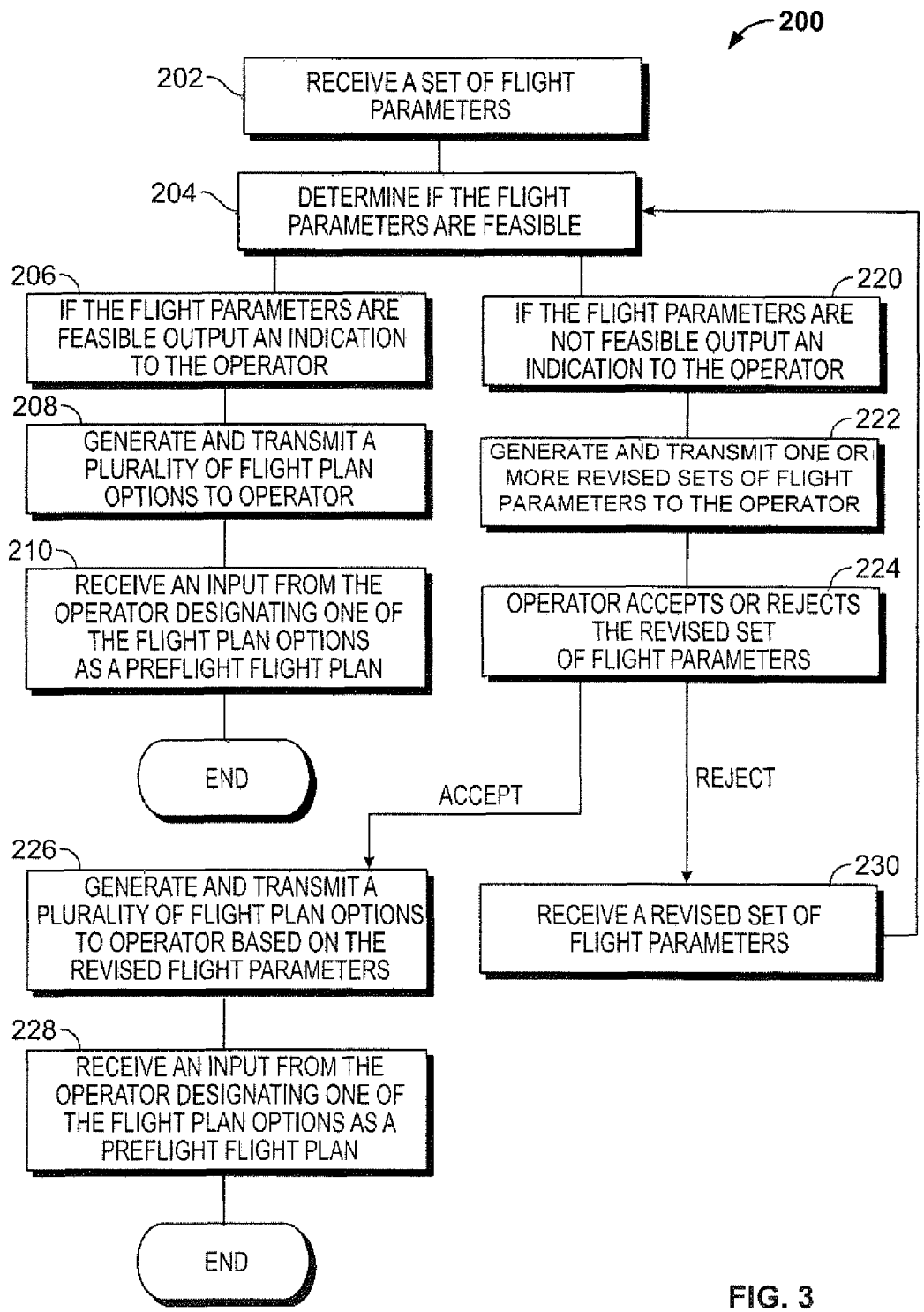
FIG. 3 is an illustration of operations for collaboratively generating a pre-flight flight plan in accordance with one embodiment.

FIG. 3 is an illustration of operations 200 for collaboratively generating a pre-flight flight plan in accordance with one embodiment. At 202, a set of flight parameters are received by the collaborative routing system 50. As described above, the flight parameters represent any objective desired to be achieved by the aircraft 12. For example, flight parameters input to the collaborative routing system 50 for an exemplary aircraft 12 may include a departure point, a departure time, an arrival point, an arrival time, an average speed, a maximum altitude, etc.

Specifically, the collaborative routing system 50 receives, maintains, and evaluates the human defined flight parameter preferences and requirements. The collaborative routing system 50 may also receive and maintain information on airspace conditions and constraints, procedures, and/or mission requirements set outside of the collaborative routing system 50.

As described above, the flight parameters may include, for example, a set of points along a proposed flight plan that the aircraft requests to visit along the flight plan. The flight parameters may also include a time the aircraft requests to arrive at these points, a preferred flying altitude at the various points or over particular flight plan segments, etc. Thus, the flight parameters represent particular parameters that the operator requests be included in the flight plan. As a result, it should be realized that a portion of the flight parameters requested by the operator may not be feasible based on air traffic, weather, etc.

Accordingly, at 204 the collaborative routing system 50 is configured to determine a feasibility of the received flight parameters. In operation, the collaborative routing system 50 evaluates the flight parameters based on a priori information of the aircraft for which the flight plan is being generated, also referred to herein as the controlled aircraft. The aircraft information may include performance metrics related to the aircraft. The aircraft information may identify an aircraft as a military fighter jet aircraft. The controlled aircraft may have known flight characteristics which may be used to generate the flight plan. The known flight characteristics may include typical trajectory information associated with the controlled aircraft, including historical information. For example, some identified aircraft may typically fly relatively direct paths despite having a relatively high maneuverability potential. Behavioral metrics may include information on the status of an aircraft, such as a status of in-transit, dog-fight, attack, pursuit, or other status. It should be realized that in determining the feasibility of flight plan parameters, the collaborative routing system 50 may also use other available and relevant information such as, for example, airspace conditions and constraints, procedures, mission information set outside of the collaborative routing system 50, etc.

The collaborative routing system 50 may also determine the feasibility of the requested flight parameters using other relevant information. The other relevant information may include, for example, airspace information. The airspace information may include, for example, metrics for the airspace, including geographical information and other data related to the airspace. The airspace information may also include metrics such as airspace complexity, density, and aircraft mix. The airspace information may further include designations, such as combat, commercial use, and the like. In operation, the collaborative routing system 50 substantially continuously revises the information utilized to determine if requested flight parameters are feasible. Other relevant information may also include mission requirements set outside of the collaborative routing system.

More specifically, the metrics may include "Directness" of the aircraft route, a probability of incident along route, and/or a nearness to threat area along the route. As such the definition of the threat area depends on the mission and the aircraft: examples would be a thunderstorm, a missile site, a mountain, congestion of commercial traffic, towers, etc. It should be realized that some metrics considered threats to smaller or slower aircraft may not be considered threats to larger aircraft. For example, mountains enroute may not be considered as hazardous for large aircraft but there are numerous incidents of General Aviation aircraft flying into mountains. The metrics may also include a measure of options for deviation along the route, airspace complexity along the route, a metric corresponding to the amount of fuel required, a measure of weather condition along the route and/or a measure of likely required altitude changes along route.

It should be realized that the above metrics described using a written description however the metrics may be implemented as mathematical formulas or algorithms resulting in a numerical output. The metrics may also generally be combined such that multiple metrics are considered. In one embodiment, the metrics may be combined as a weighted sum. For example, $a_1*M_1+a_2*M_2+ \ldots +a_n*m_n$ with $a_1, \ldots, a_n$ real numbers greater than zero, $a_1+ \ldots +a_n=1$, and where $M_1, \ldots, M_n$ are metrics is a weighted sum of n metrics.

In one embodiment, if the requested flight parameters are feasible, then at 206, the collaborative routing system 50 is configured to provide the operator with feedback indicating that the requested flight parameters are feasible. Additionally, at 208 the collaborative routing system 50 is also configured to generate, using the flight parameters, and transmit a plurality of flight plan options to the operator of the controlled aircraft wherein each flight plan option represents a feasible flight plan that may be selected by the operator. At 210, the collaborative routing system 50 is configured to receive an input from the operator designating or selecting one of the flight plan options as the preflight flight plan. The preflight flight plan may be stored for future use. More specifically, the preflight flight plan may be utilized by the collaborative routing system 50 to generate or modify flight plans for other aircraft 12.

Referring again to FIG. 3, in another embodiment, if the requested flight parameters entered at 204 are not feasible, then the method proceeds to step 220. At 220, the collaborative routing system 50 provides the operator with feedback indicating that the requested flight parameters are not feasible. More specifically, the collaborative routing system 50 provides the operator with a list stating specifically which flight parameters are not feasible. The collaborative routing system 50 may also provide the operator with reasons for stating that at least some of flight parameters are not feasible.

At 222, the collaborative routing system 50 automatically provides a modified set of flight parameters to the operator. For example, assume that the initial set of flight parameters provided by the operator includes five individual flight parameters. Moreover, assume that the collaborative routing system 50 is able to generate at least one flight plan option using four of the flight parameters. In this case, at 220 the collaborative routing system 50 informs the operator that the fifth flight parameter cannot be used to generate a feasible flight plan. Accordingly, at 222, the collaborative routing system 50 automatically generates a revised set of flight parameters that may include for example, the initial four parameters and a new fifth parameter. The revised set of flight parameters are then transmitted to the operator. Optionally, the collaborative routing system 50 may automatically generate a set of flight plan options based only on the feasible flight parameters. Moreover, the collaborative routing system 50 may provide the operator with a set of metrics that indicate a percentage of the flight parameters achieved by the flight plan.

At 224, the operator may either accept the revised set of flight parameters or input a different set of flight parameters based on the revised set of flight parameters and the indication of which of the initial flight parameters was not feasible.

In one embodiment, if the operator accepts the revised set of flight parameters generated by the collaborative routing system 50, then at 226, the collaborative routing system 50 generates and transmits a plurality of flight plan options to the operator, wherein each flight plan option represents a feasible flight plan that may be selected by the operator. At 228, the collaborative routing system 50 is configured to receive an input from the operator designating or selecting one of the flight plan options as the preflight flight plan. The preflight flight plan may be stored for future use. More specifically, the preflight flight plan may be utilized by the collaborative routing system 50 to generate or modify flight plans for other aircraft 12.

In another embodiment, if the operator rejects the revised set of flight parameters generated by the collaborative routing system 50, then at 230 the operator may manually input a second or revised set of flight parameters to the collaborative routing system 50. Optionally, the operator may rank the initial set of flight parameters in order of importance and instruct the collaborative routing system to generate a feasible preflight plan that satisfies the highest ranking elements while potentially not satisfying lower ranking elements.

The method then proceeds to step 204 wherein the method is iteratively repeated until the collaborative routing system 50 is able to generate a feasible preflight plan based on flight parameters entered by the operator. Accordingly, the collaborative routing system 50 collaborates with the operator to generate a set of feasible flight parameters that will enable the collaborative routing system 50 to generate a feasible preflight plan.

Figure 4:
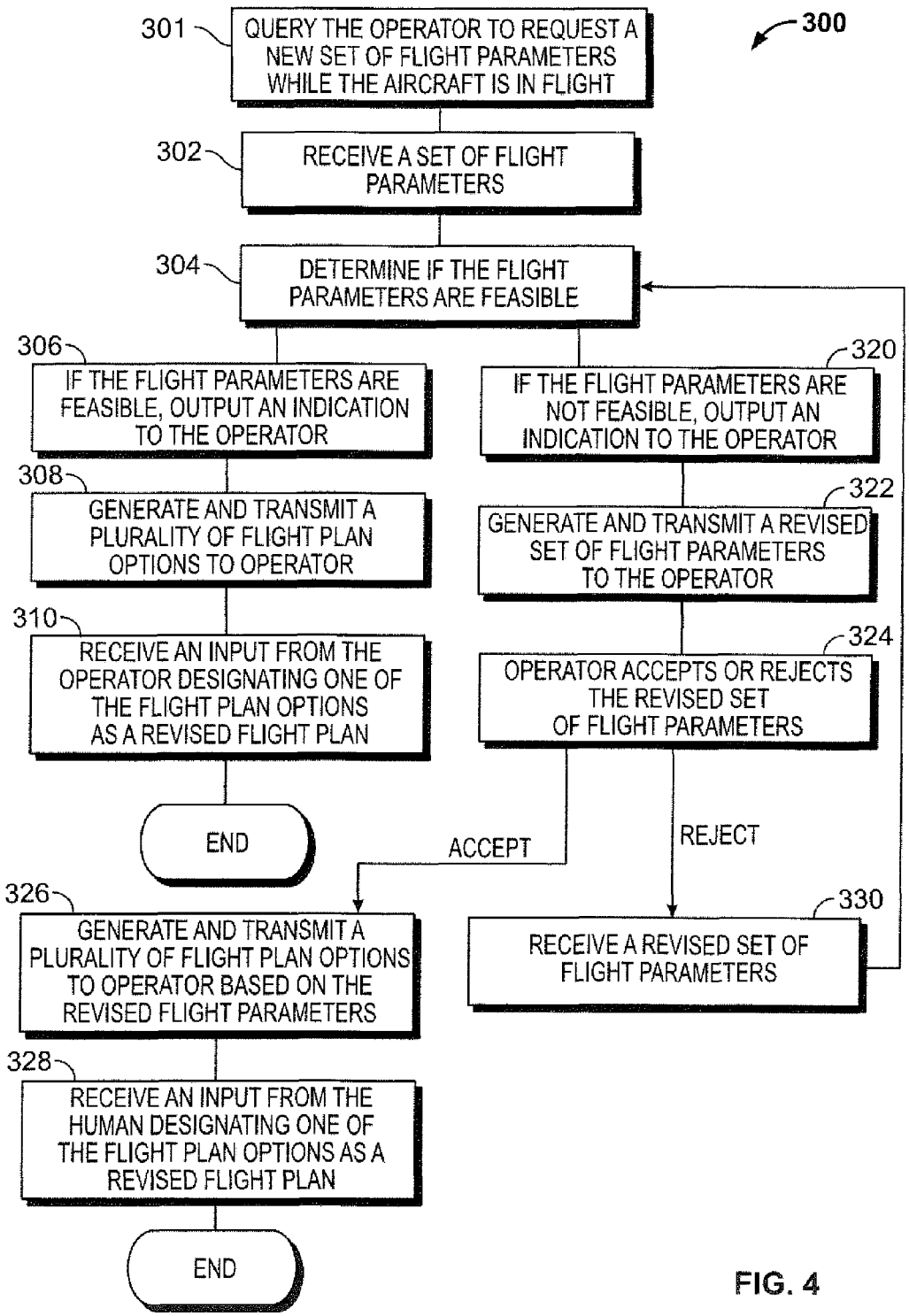
FIG. 4 is an illustration of operations for collaboratively generating or revising an existing flight plan in accordance with one embodiment.

FIG. 4 is an illustration of operations 300 for collaboratively generating or revising the modified flight plan while the aircraft 12 is in flight in accordance with one embodiment. For example, an operator may desire to revise the flight plan in response to changing weather conditions that occur during flight, in response to changing air traffic conditions, and/or in response to emergency conditions. Flight plan modifications may be initiated by either the operator, the collaborative routing system 50 and/or a third party. For example, the operator may desire to modify the flight plan. Moreover, the collaborative routing system 50 is continuously monitoring the aircraft during flight to identify factors that may prohibit the ability of the aircraft to continue along a selected flight plan. For example, the collaborative routing system 50 may automatically determine an increased level of air traffic, an increased level of aircraft density at a particular location, changing weather conditions, etc. As a result of the continuous airspace monitoring, the collaborative routing system 50 may desire to re-route the aircraft around the dense airspace, around the weather, or to a different airport, etc. The collaborative routing system 50 therefore provides situation awareness to the operator to enable the operator to collaborate in generating a new flight plan as described in more detail below. The collaborative routing system 50 also provides a warning indication that it is desirable to re-route the aircraft to avoid one or more of the above conditions. Optionally, the collaborative routing system 50 may provide a warning or danger indication that it is mandatory to re-route the aircraft to avoid the above conditions or a midair collision, for example.

Accordingly at 301, the collaborative routing system 50 queries the operator to request a new set of flight parameters in response to a warning indication. If the operator agrees to reroute the aircraft, then at 302 the operator inputs a revised set of flight parameters to the collaborative routing system 50. Optionally, if the operator rejects the request to re-route the aircraft 12, the aircraft 12 continues in flight using the existing flight plan.

At 304 the collaborative routing system 50 is configured to determine a feasibility of the received flight parameters. As described above, the collaborative routing system 50 evaluates the flight parameters based on a priori information of the aircraft for which the flight plan is being generated.

Figure 5:
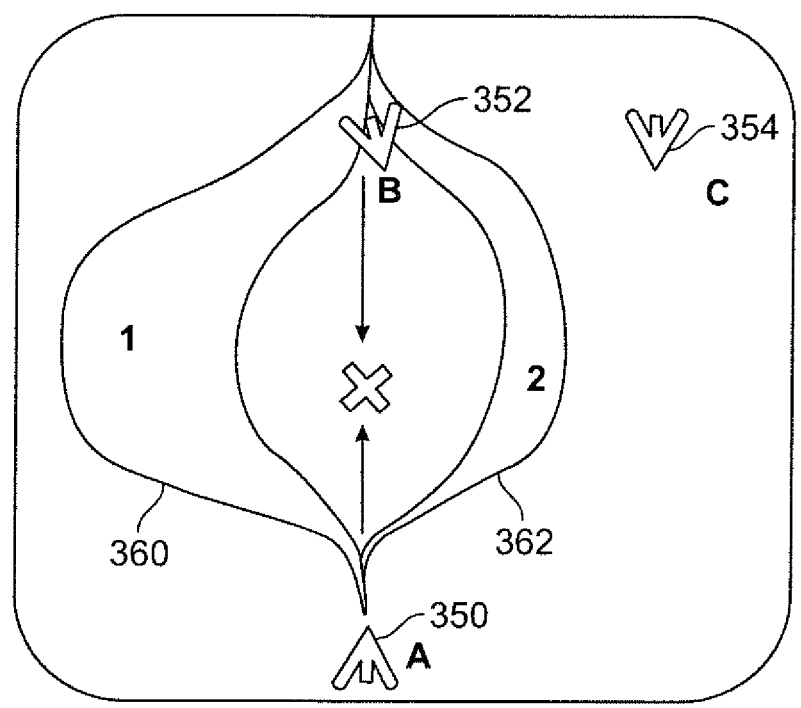
FIG. 5 is an illustration of various flight path options that may be generated in accordance with one embodiment.

In one embodiment, if the requested flight parameters are feasible, then at 306, the collaborative routing system 50 is configured to provide the operator with feedback indicating that the requested flight parameters are feasible. Additionally, at 308 the collaborative routing system 50 is also configured to generate and transmit a plurality of flight plan options to the operator of the controlled aircraft wherein each flight plan option represents a feasible flight plan that may be selected by the operator. In various embodiments, the flight plan options may be embodied as a plurality of fat paths as shown in FIG. 5. It should be understood that FIG. 5 depicts a simple case and that there may be fewer or larger number of fat paths depending on airspace configuration and aircraft maneuver restrictions. As used herein, a fat path is flight area that is of sufficient size to enable an aircraft to transit the area using several different trajectories, i.e. along any one of several flight plans. For example, and referring to FIG. 5, assume that the collaborative routing system 50 receives a set of flight parameters from an aircraft 350. Moreover, assume that the collaborative routing system 50 is aware of the flight paths of a first aircraft 352 and a second aircraft 354. Accordingly, in various embodiments, the collaborative routing system 50 may generate a first fat path 360 and a second fat path 362 that enable the aircraft 350 to avoid the flight paths of both the aircraft 352 and 354. More specifically, given a set of routing constraints, a start point, an end point, and a manifold embedded in 4D space (i.e. space-time), a fat path is a maximal simply connected region contained in the manifold such that for any point in the region there exists a feasible route that contains the point, is contained in the region, begins at the start point, and ends at the end point. A route is feasible if it satisfies the routing constraints. An example routing constraint is that no turn resulting in load factor greater than two is allowed. In practice, regions to avoid would typically be represented as holes in the manifold. The operator may then select the first fat path 360 or the second fat path 362. Based on the fat path selection, the collaborative routing system 50 generates and transmits the flight plan options within the selected fat path to the operator 308.

At 310, the collaborative routing system 50 is configured to receive an input from the operator designating or selecting one of the flight plan options as the revised flight plan. The flight plan may then be implemented by the operator while the aircraft 12 is in flight. More specifically, the revised light flight plan replaces the previous flight plan for the aircraft 12. In various embodiments, the collaborative routing system 50 may rank the flight plan options within the selected fat path to assist the operator with selecting a flight plan.

In another embodiment, if the requested flight parameters entered at 304 are not feasible, then the method proceeds to step 320. At 320, the collaborative routing system 50 provides the operator with feedback indicating that the requested flight parameters are not feasible. More specifically, the collaborative routing system 50 provides the operator with a list stating specifically which flight parameters are not feasible.

At 322, the collaborative routing system 50 automatically provides a modified set of flight parameters to the operator. For example, assume that the initial set of flight parameters provided by the operator includes five individual flight parameters. Moreover, assume that the collaborative routing system 50 is able to generate at least one flight plan option using four of the flight parameters. In this case, at 320 the collaborative routing system 50 informs the operator that the fifth flight parameter cannot be used to generate a feasible flight plan. Accordingly, at 322, the collaborative routing system 50 automatically generates a revised set of flight parameters that may include for example, the initial four parameters and a new fifth parameter as described above. The revised set of flight parameters are then transmitted to the operator.

At 324, the operator may either accepts the revised set of flight parameters or inputs a subsequent set of flight parameters based on the revised set of flight parameters and the indication of which of the initial flight parameters was not feasible.

In one embodiment, if the operator accepts the revised set of flight parameters generated by the collaborative routing system 50, then at 326, the collaborative routing system 50 generates and transmits a plurality of flight plan options to the operator, wherein each flight plan option represents a feasible flight plan that may be selected by the operator. At 328, the collaborative routing system 50 is configured to receive an input from the operator designating or selecting one of the flight plan options as the flight plan. The flight plan may be stored for future use. More specifically, the flight plan may be utilized by the collaborative routing system to generate or modify flight plans for other aircraft 12.

In another embodiment, if the operator rejects the revised set of flight parameters generated by the collaborative routing system 50, then at 330 the operator may manually input a second or revised set of flight parameters to the collaborative routing system 50. Optionally, the operator may rank the initial set of flight parameters in order of importance and instruct the collaborative routing system to generate a feasible preflight plan that satisfies the highest ranking elements while potentially not satisfying lower ranking elements.

The method then proceeds to step 304 wherein the method is iteratively repeated until the collaborative routing system 50 is able to generate a feasible preflight plan based on flight parameters entered by the operator. Accordingly, the collaborative routing system 50 collaborates with the operator to generate a set of feasible flight parameters that will enable the collaborative routing system 50 to generate a feasible preflight plan.

Figure 6:
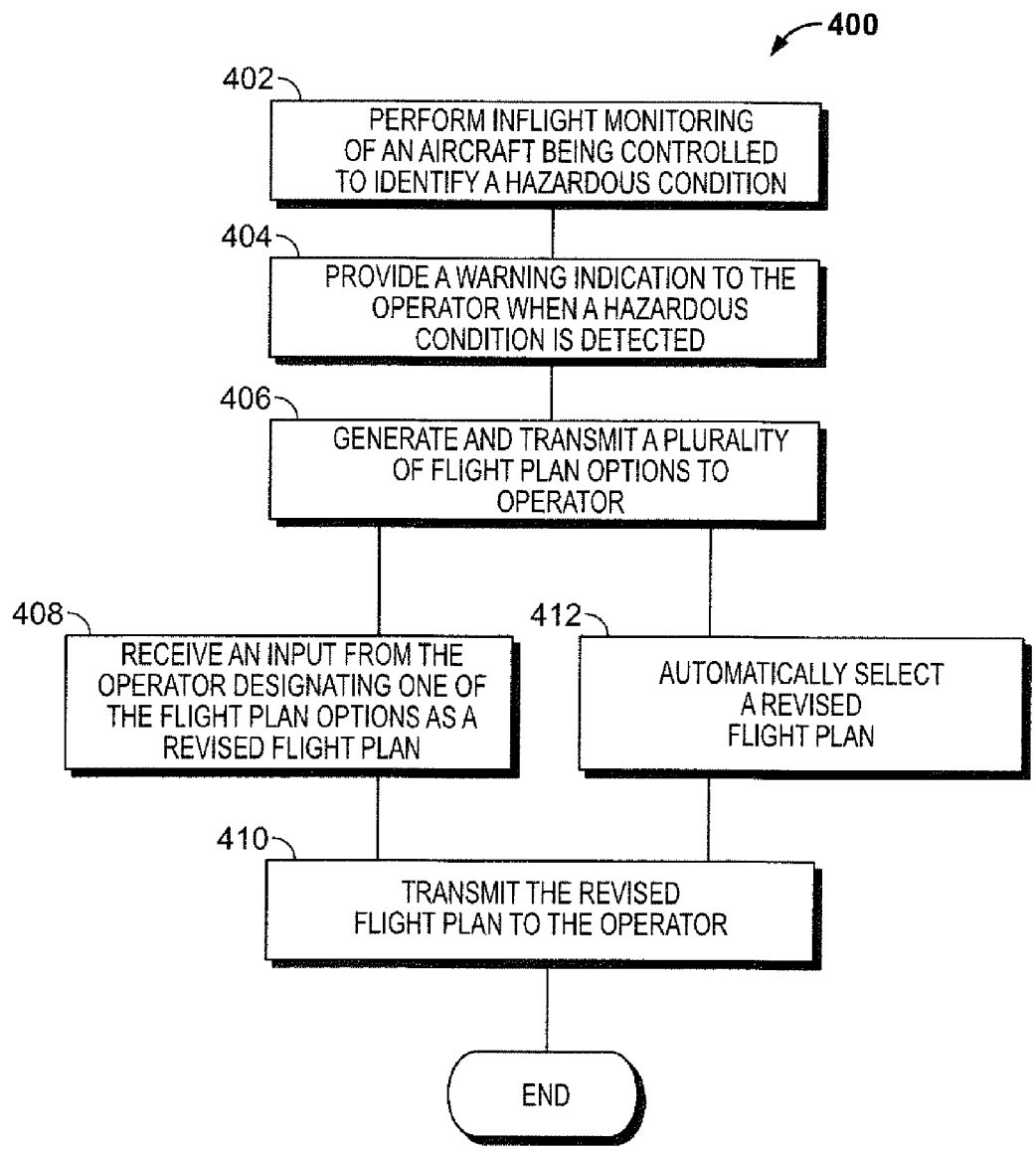
FIG. 6 is an illustration of operations for collaboratively generating or revising an existing flight plan in response to a hazardous condition in accordance with one embodiment.

As described above, the collaborative routing system 50 is also operational in a third mode of operation. Accordingly, FIG. 6 is an illustration of operations for collaboratively generating or revising an existing flight plan in response to a hazardous condition in accordance with one embodiment. The hazardous condition may include for example, a loss of separation between the aircraft being controlled and a second aircraft. The hazardous condition may also include changing weather conditions that occur during flight, changing air traffic conditions, and/or other emergency conditions.

At 402, the collaborative routing system 50 performs inflight monitoring of the aircraft 12 to identify a hazardous condition. For example, the collaborative routing system 50 may substantially continuously receive information relating to other aircraft operating in the defined airspace from the airspace monitoring and aircraft tracking devices 54, the airborne command and control aircraft 56, and/or the satellites 58. At 404, a warning indication is provided to the operator when a hazardous condition is detected. For example, the warning indication may represent a midair collision.

Accordingly at 406, the collaborative routing system 50 is configured to generate and transmit a plurality of hazardous avoidance flight plan options to the operator of the controlled aircraft wherein each flight plan option represents a feasible flight plan that may be selected by the operator. In various embodiments, the flight plan options may be embodied as a plurality of fat paths as shown in FIG. 5.

At 408, the collaborative routing system 50 is configured to receive an input from the operator designation or selecting one of the flight plan options as the revised flight plan within a predetermined amount of time. In various embodiments, the predetermined amount of time is based on the time required for the aircraft 12 to avoid the hazardous condition.

At 410, the collaborative routing system 50 is configured to transmit the revised flight plan to the operator. Optionally, if the input is not received from the operator in the predetermined amount of time, then at 412 the collaborative routing system 50 automatically generates and transmits a revised flight plan to the operator based on the analysis performed by the collaborative routing system 50 of the hazardous condition and an acceptable flight path that will enable the aircraft 12 to avoid the hazardous condition.

More specifically, in general the collaborative routing system 50 is configured to present multiple flight path options to the operator. However, depending on the amount of time available, such as to avoid a hazardous condition, there may be more or less time for the operator to iteratively collaborate with the system. Accordingly, to avoid a collision, the collaborative routing system 50 may automatically select a flight path for the aircraft 12.

As described above, the collaborative routing system 50 is capable of generating a pre-flight flight plan, revising a flight plan in flight, and automatically generating a flight plan to avoid a hazardous condition. Additionally, the collaborative routing system 50 is capable of providing multiple flight plans to multiple aircraft operating concurrently in the defined airspace 14.

Figure 7:
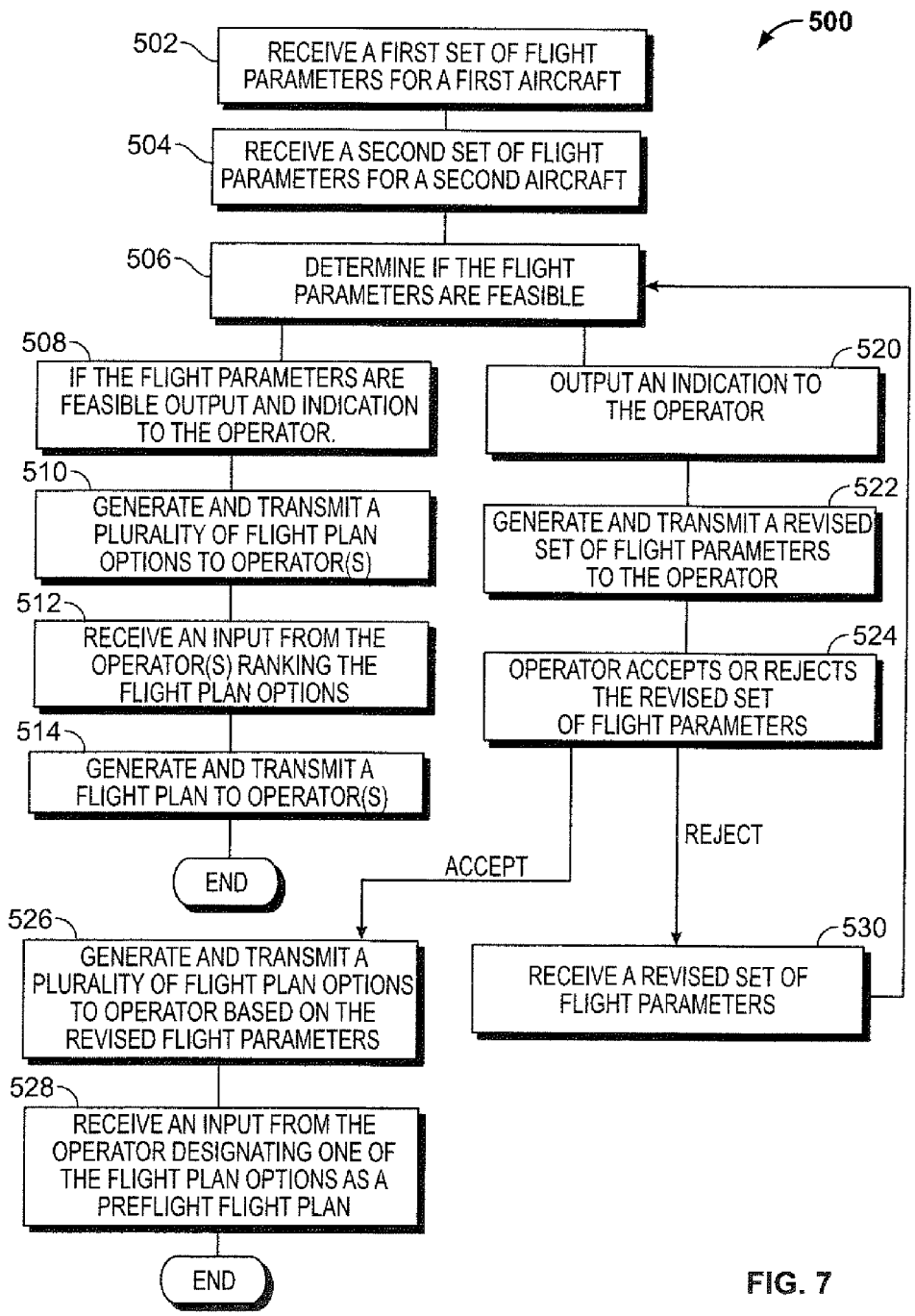
FIG. 7 is an illustration of operations for collaboratively generating or revising a plurality of mutually feasible flight plans in accordance with one embodiment.

FIG. 7 is an illustration of operations 500 for collaboratively generating or revising a plurality of mutually feasible flight plans in accordance with one embodiment. At 502, a first set of flight parameters are received by the collaborative routing system 50 from an operator of a first aircraft, such as the UV 26. At 504, a second set of flight parameters are received by the collaborative routing system 50 from an operator of a second aircraft, such as the UV 30. It should be realized that although various embodiments are described with respect to generating a mutually feasible flight plan for two aircraft, that the collaborated routing system 50 is capable of generating mutually feasible flight plans for more than two aircraft substantially concurrently in real-time.

At 506, the collaborative routing system 50 determines a feasibility of the first and second set of flight parameters. In one embodiment, if the requested flight parameters are feasible for both aircraft are feasible, then at 508, the collaborative routing system 50 provides the one or more operators with feedback indicating that the requested flight parameters are feasible. Additionally, at 510 the collaborative routing system 50 generates and transmits a plurality of flight plan options to the operator(s) of the UV's 26 and 30. At 512, the collaborative routing system 50 receives an input from the operator(s) designating or ranking the flight plan options. At 514, the collaborative routing system 50 generates and transmits a flight plan to the operator(s) of the UVs 26 and 30.

In another embodiment, if the requested flight parameters entered at 502 and/or 504 are not feasible, then the method proceeds to step 520. At 520, the collaborative routing system 50 provides the operator(s) with feedback indicating that the requested flight parameters are not feasible. More specifically, the collaborative routing system 50 provides the operator with a list stating specifically which flight parameters are not feasible.

At 522, the collaborative routing system 50 automatically provides a modified or revised set of flight parameters to the operator. At 524, the operator may either accept the revised set of flight parameters or input a subsequent set of flight parameters based on the revised set of flight parameters and the indication of which of the initial flight parameters was not feasible.

In one embodiment, if the operator accepts the revised set of flight parameters generated by the collaborative routing system 50, then at 526, the collaborative routing system 50 generates and transmits a plurality of flight plan options to the operator, wherein each flight plan option represents a feasible flight plan that may be selected by the operator. At 528, the collaborative routing system 50 receives an input from the operator designating or selecting one of the flight plan options and automatically generates a flight plan based on the received input.

In another embodiment, if the operator of either the UV 26 or the UV 28 rejects the revised set of flight parameters generated by the collaborative routing system 50, then at 530 the operator may manually input a second or revised set of flight parameters to the collaborative routing system 50. Optionally, the operator may rank the initial set of flight parameters in order of importance and instruct the collaborative routing system to generate a feasible flight plan that satisfies the highest ranking elements while potentially not satisfying lower ranking elements.

The method then proceeds to step 506 wherein the method is iteratively repeated until the collaborative routing system 50 is able to generate a feasible flight plan based on flight parameters entered by the operator(s). Accordingly, the collaborative routing system 50 collaborates with the operator(s) to generate a plurality of feasible flight parameters that will enable the collaborative routing system 50 to generate a plurality of feasible flight plans.

Figure 8:
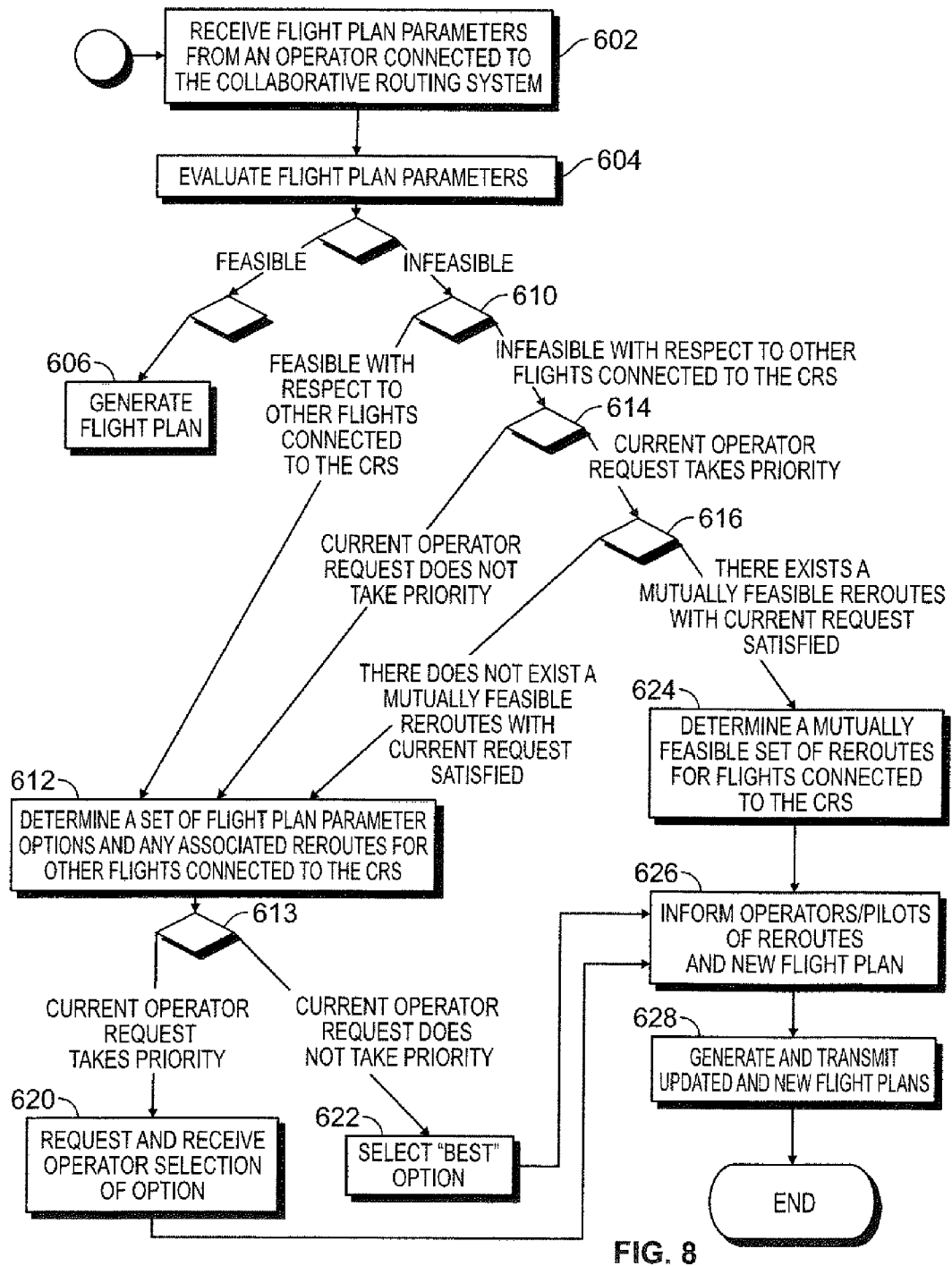
FIG. 8 is another illustration of operations for collaboratively generating or revising a plurality of mutually feasible flight plans in accordance with one embodiment.

FIG. 8 is another illustration of operations 600 for collaboratively generating or revising a plurality of mutually feasible flight plans in accordance with one embodiment. At 602, a set of flight parameters are received by an operator connected to the collaborative routing system 50. At 604, the collaborative routing system 50 determines a feasibility of the set of flight parameters. In one embodiment, if the set of flight parameters are feasible, then at 606, the collaborative routing system 50 generates and transmits a flight plan to the operator of the collaborative routing system 50.

In another embodiment, if the requested flight parameters entered at 602 are not feasible, then the method proceeds to step 610. At 610, the collaborative routing system 50 determines if the flight parameters are feasible or infeasible with respect to other flight being controlled by the collaborative routing system 50. In one embodiment, if the flight parameters are feasible with respect to the other flights, then at 612, the collaborative routing system 50 generates a plurality of flight plan options and any associated reroutes for other flights connected to the collaborative routing system 50. At 613, the collaborative routing system 50 determines if the current operator request takes priority over other flights connected to the collaborative routing system 50. In one embodiment, if the current operator flight parameters take priority, then at 620, the collaborative routing system 50 requests and receives an input from the operator designating or selecting one of the flight plan options as the flight plan. Optionally, if the current operator request does not take priority, then at 622, the collaborative routing system 50 selects a best flight plan option for the operator. The best flight plan option is the flight plan that meets most of the flight plan parameters. At 626, the collaborative routing system 50 informs the operators and/or the pilots of the reroutes and generates a new flight plan. At 628, the collaborative routing system 50 generates and transmits the updated and new flight plans to the operators and/or the pilots.

As described above, if at 610 the collaborative routing system 50 determines that the flight parameters are not feasible, then at 614 the collaborative routing system 50 determines if the current operator requested flight parameters take priority over other requested flight parameters. In one embodiment, if the current operator requested flight parameters do not take priority, the method proceeds to step 612 and proceeds as described above. Optionally, if the current operator requested flight parameters do take priority, the method proceeds to step 616 wherein the collaborative routing system 50 determines if there are mutually feasible reroutes available. For example, if there are not any mutually feasible reroutes available, the method proceeds to step 612 and proceeds as described above. Optionally, if mutually feasible reroutes are available, then at 624, the collaborative routing system 50 determines a mutually feasible set of reroutes for flights connected to the collaborative routing system 50. At 626, the collaborative routing system 50 receives the mutually feasible set of reroutes and proceeds as described above.

It should be noted that the various embodiments or portions thereof, such as the vehicle management system 10 may be implemented in hardware, software or a combination thereof. The various embodiments and/or components, for example, the collaborative routing system 50 also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A method for generating a flight plan for one or more unmanned aircraft, said method comprising:
   receiving, by a collaborative routing system, a plurality of flight parameters from one or more unmanned aircraft system control stations that are configured to control the one or more unmanned aircraft;
   automatically generating, by the collaborative routing system, a plurality of flight plan options for the one or more unmanned aircraft;
   automatically presenting, by the collaborative routing system, the plurality of flight plan options on a display of the one or more unmanned aircraft system control stations;
   selecting, through at least one input device of the one or more unmanned aircraft control system stations, one of the plurality of flight plan options; and
   operating the one or more unmanned aircraft in a defined airspace based on the selected one of the plurality of flight plan options.

2. The method of claim 1 further comprising:
   determining, by the collaborative routing system, a feasibility of the received flight parameters; and
   if the flight parameters are feasible, using the collaborative routing system to generate and transmit at least one flight plan, the flight plan including metrics that indicate a percentage of the flight parameters achieved by each flight plan option.

3. The method of claim 1 further comprising:
   determining, by the collaborative routing system, a feasibility of the received flight parameters; and
   if the flight parameters are not feasible, using the collaborative routing system to generate and transmit one or more suggested flight plan parameter modifications.

4. The method of claim 3 further comprising:
   receiving, by the collaborative routing system from the one or more unmanned aircraft system control stations, an input ranking the flight plan parameter modifications; and
   using the collaborative routing system to automatically present at least one revised flight plan option based on the received input.

5. The method of claim 1 further comprising:
   receiving, by the collaborative routing system from the one or more unmanned aircraft system control stations, an input designating at least one of the flight plan options as a selected flight plan;
   automatically monitoring, with the collaborative routing system, the defined air space around the unmanned aircraft to identify factors that may prohibit the ability of the unmanned aircraft to continue along the selected flight plan; and
   using the collaborative routing system to automatically generate and transmit one or more suggested flight plan modifications based on the factors.

6. The method of claim 1 further comprising:
   receiving, by the collaborative routing system from the one or more unmanned aircraft system control stations, an input accepting or rejecting the suggested flight plan modifications; and
   if the suggested flight plan modifications are accepted, using the collaborative routing system to generate and transmit a revised flight plan.

7. The method of claim 1 further comprising:
   automatically presenting, with the collaborative routing system, at least two fat path options based on the received flight parameters;
   receiving an input, by the collaborative routing system from the one or more unmanned aircraft system control stations, selecting one of the fat path options; and
   using the collaborative routing system to automatically generate and transmit the flight plans options based on the received input.

8. The method of claim 1 further comprising:
   receiving a first set of flight parameters from a first unmanned aircraft system control station for controlling an operation of a first unmanned aircraft;
   receiving a second set of flight parameters from a second unmanned aircraft system control station for controlling an operation of a second unmanned aircraft and
   using the collaborative routing system to generate a mutually feasible set of flight plan options for the first and second unmanned aircraft.

9. The method of claim 8 further comprising
receiving an input from one or both of the first and second unmanned aircraft system control stations ranking the mutually feasible flight plan options; and
using the collaborative routing system to generate a flight plan for the first and second aircraft based on the received input.

10. A vehicle management system configured to control operation of one or more aircraft within a defined airspace, said vehicle management comprising:
one or more unmanned aircraft system control stations configured to operate the one or more unmanned aircraft within the defined airspace, wherein the one or more unmanned aircraft system control stations comprises at least one display and at least one input device; and
a collaborative routing system in communication with the one or more unmanned aircraft system control stations, wherein the collaborative routing system includes at least one processor that is configured to receive flight parameters from the one or more unmanned aircraft system control stations and automatically present a plurality of flight plan options to operate the one or more unmanned aircraft on the at least one display, and wherein the at least one input device is configured to be used to select one of the flight plan options from the plurality of flight plan options,
wherein the one or more unmanned aircraft are configured to be operated in the defined airspace based on the selected one of the flight plan options.

11. The vehicle management system of claim 10, wherein the at least one processor is configured to determine a feasibility of the received flight parameters, and, if the flight parameters are feasible, generate and transmit one or more flight plans, the flight plans including metrics that indicate a percentage of the flight parameters achieved by each flight plan option.

12. The vehicle management system of claim 10, wherein the at least one processor is configured to determine a feasibility of the received flight parameters, and, if the flight parameters are not feasible, generate and transmit one or more suggested flight plan parameter modifications.

13. The vehicle management system of claim 10, wherein the at least one processor is configured to receive an input from the one or more unmanned aircraft system control stations, wherein the input ranks the flight plan parameter modifications, and wherein the collaborative routing system is configured to automatically present, to the one or more unmanned aircraft system control stations, at least one revised flight plan option based on the received input.

14. The vehicle management system of claim 10, wherein the at least one processor is configured to: (i) receive an input from the one or more unmanned aircraft system control stations designating at least one of the flight plan options as a selected flight plan, (ii) automatically monitor the defined air space around the one or more aircraft to identify factors that may prohibit the ability of the one or more unmanned aircraft to continue along the selected flight plan; and (iii) automatically generate and transmit one or more suggested flight plan modifications based on the automatically identified factors.

15. The vehicle management system of claim 14, wherein the at least one processor is configured to receive an input from the one or more unmanned aircraft system control stations accepting or rejecting the suggested flight plan modifications, and if the suggested flight plan modifications are accepted, generate and transmit a revised flight plan.

16. The vehicle management system of claim 10, wherein the at least one processor is configured to: (i) automatically present to the one or more unmanned aircraft system control stations at least two fat path options based on the received flight parameters, (ii) receive an input from the one or more unmanned aircraft system control stations selecting one of the fat path options, and (iii) automatically generate and transmit the flight plans options to the one or more unmanned aircraft system control stations based on the received input.

17. The vehicle management system of claim 10, wherein the at least one processor is configured to: (i) receive a first set of flight parameters from a first unmanned aircraft system control station for controlling an operation of a first unmanned aircraft, (ii) receive a second set of flight parameters from a second unmanned aircraft system control station for controlling an operation of a second unmanned aircraft, and (iii) generate a mutually feasible set of flight plan options for the first and second unmanned aircraft.

18. The vehicle management system of claim 17, wherein the at least one processor is configured to: (i) receive an input from one or both of the first and second unmanned aircraft system control stations ranking the first and second set of mutually feasible flight plan options, and (ii) generate a flight plan for the first and second unmanned aircraft based on the received input.

19. A method for generating a plurality of mutually feasible flight plans for a plurality of aircraft, said method comprising:
receiving, by a collaborative routing system from a first aircraft system control station that is configured to control a first aircraft, a first set of flight parameters for controlling an operation of the first aircraft;
receiving, by the collaborative routing system from a second aircraft system control station that is configured to control the second aircraft, a second set of flight parameters for controlling an operation of the second aircraft;
using the collaborative routing system to generate a mutually feasible set of flight plan options for the first and second aircraft;
selecting, through at least one input device of the first or second aircraft system control stations, a mutually feasible set of flight plan options; and
operating one or both of the first and second aircraft in a defined airspace based on the selected mutually feasible set of flight plan options.

20. The method of claim 19 further comprising
receiving at least one input from one or both of the first and second aircraft system control stations ranking the mutually feasible flight plan options; and
using the collaborative routing system to generate a flight plan for the first and second aircraft based on the received input.

* * * * *